United States Patent [19]

Komagata

[11] Patent Number: 4,621,296
[45] Date of Patent: Nov. 4, 1986

[54] MAGNETIC HEAD UNIT

[75] Inventor: Atsushi Komagata, Niigata, Japan

[73] Assignee: Alps Electric Co., Ltd., Japan

[21] Appl. No.: 630,655

[22] Filed: Jul. 13, 1984

[30] Foreign Application Priority Data

Jul. 13, 1983 [JP] Japan .......................... 58-107591[U]

[51] Int. Cl.⁴ .............................................. G11B 5/27
[52] U.S. Cl. ..................................... 360/121; 360/118
[58] Field of Search ............... 360/118, 121, 122, 125; 29/603

[56] References Cited

U.S. PATENT DOCUMENTS 3,964,103  6/1976  Thompson et al. ................. 360/118
4,110,804  8/1978  Castrodale et al. ................. 360/118
4,506,308  3/1985  Furuichi et al. ..................... 360/118

Primary Examiner—Robert S. Tupper
Attorney, Agent, or Firm—Guy W. Shoup

[57] ABSTRACT

A magnetic head unit comprises erase heads on both sides of a read/write head and an erasing back core having the ]-shaped cross section consisting of a magnetic material. The back core is engaged with the open end of a rear part opposing to the gap forming region in front of the cores of both erase heads, thereby ensuring high magnetic efficiency, receiving lesser influence of external magnetic field, and improving the magnetic characteristic and back core mounting work efficiency.

2 Claims, 4 Drawing Figures

MAGNETIC HEAD UNIT

FIELD OF THE INVENTION

This invention relates to a magnetic head unit to be used in a floppy disc drive apparatus and particularly to a magnetic head unit wherein erase (hereinafter abbreviated as Er) heads are provided on both sides of a read/write (hereinafter abbreviated as R/W) head in order to perform so-called tunnel type erasing operation.

BACKGROUND OF THE INVENTION

FIG. 1 and FIG. 2 are respectively perspective views indicating magnetic head units of the prior art. FIG. 3 shows the bottom view of the magnetic head unit shown in FIG. 1 and FIG. 2.

In FIG. 1 and FIG. 3, A indicates a R/W head; 1 is one core of the R/W head A; 2 is the other core thereof, M is gap formed between both cores 1 and 2; 8 is R/W coil of R/W head A wound on said core 1. B is a first Er head provided at one side of said R/W head A. 3 and 4 are a pair of cores forming said head B; $N_1$ is gap between both cores 3 and 4; C is the second Er head provided at the other side of R/W head A; 5, 6 are a pair of cores forming said second Er head; $N_2$ is gap between both cores 5 and 6; 9 is a common Er head for Er heads B, C wound on said cores 3 and 5; 10 is a R/W back core bridging the upper ends of cores 1, 2 of R/W head A; 11 is an L-shaped Er back core capped on the Er coil 9 which has the structure, for equalizing the intensity of field of the two Er heads B and C, that a constant space is kept through the Er coil 9 between the upper end surface of the cores 3, 5 of both Er heads B and C and the Er back core 11. 7 is a slider which is composed of barium titanate ceramic and is slidingly in contact with a disc D. At the sliding surface with said disc D, the gap M of R/W head A and gaps $N_1$, $N_2$ of Er heads B, C are formed as shown in FIG. 3. Here, 23, 24 and 25 are spacers consisting of ceramic etc. formed on the same plane as said gaps $N_1$, M, $N_2$.

However, since the magnetic head unit of the prior art has a structure that a constant space is kept between the cores 3, 5 of Er heads B, C and the Er back core 11, it has the disadvantage that it is difficult for assembling to obtain such constant space. This difficulty has an adverse effect on magnetic efficiency and leak of magnetic flux easily generates distortion of waveform.

Moreover, as shown in FIG. 2, it is also known to employ the structure that one Er back core 21 is bridged to the side surface of a pair of cores 3, 4 forming one Er head B, while the other Er back core 22 is bridged to the side surface of a pair of cores 5, 6 forming the other Er head C. However, this structure results in such disadvantage that a pair of Er back cores 21, 22 are required, namely the number of parts increases and simultaneously the number of assembling steps also increases. The Er back cores 21, 22 are easily displaced vertically and horizontally from the specified position at the time of assembling; such displacement causes fluctuation of head characteristics and moreover magnetic flux leaks from the upper end of Er cores 3, 5.

SUMMARY OF THE INVENTION

This invention is proposed in order to improve such disadvantage of the prior art and has an object of providing a magnetic head unit which has a high magnetic efficiency, receives little influence from external magnetic fields, results in less leak of magnetic flux and simultaneously shows less waveform distortion, suppresses fluctuation of characteristics by making small the possibility of error in dimensions at the time of assembling the Er back core and improves the Er back core fitting work efficiency.

DETAILED DESCRIPTION OF THE INVENTION

Figure 1:
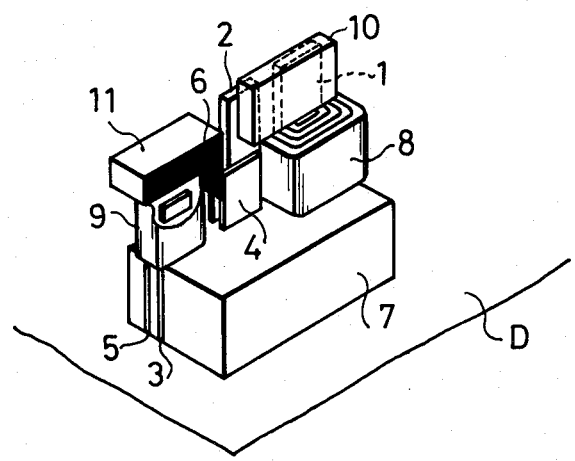
FIG. 1 and FIG. 2 are perspective views of magnetic head units of the prior art.
Figure 2:
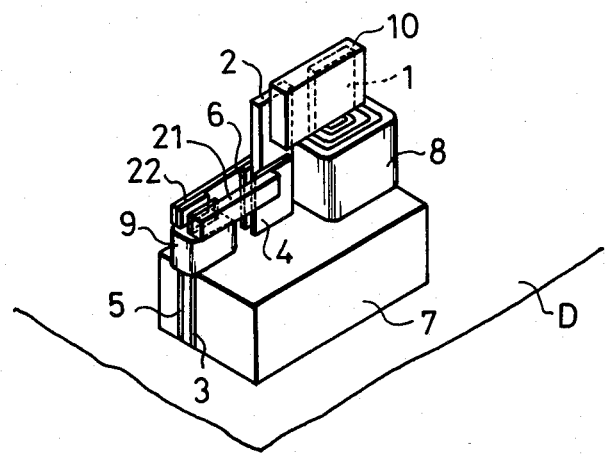
Figure 3:
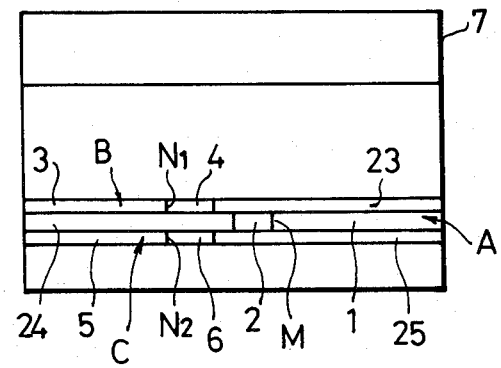
FIG. 3 is a bottom view of the magnetic head unit shown in FIG. 1 and FIG. 2.
Figure 4:
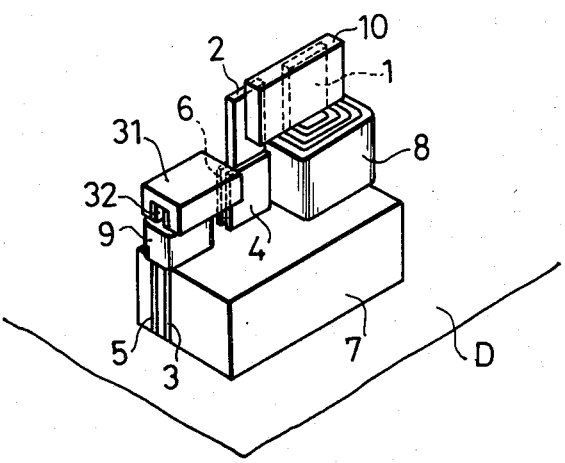
FIG. 4 is a perspective view of a magnetic head unit of this invention.

FIG. 4 is a perspective view indicating an embodiment of a magnetic head unit of the invention. The same parts as those in FIGS. 1–3 are given the same symbols and these are not described in detail.

In FIG. 4, 31 is a back core having the ⊐-shaped cross section by forming a groove 32 at the center. Back core 31 engages with the open end of the rear part of the assembly on the opposite side from said gaps $N_1$ and $N_2$ of cores 3, 4 of Er head B and cores 5, 6 of Er head C.

In this case, the external surfaces of cores 3, 4 abut against one side of the internal surface of groove 32 of the Er back core 31, while the external surfaces of Er cores 5, 6 abut against the other side of the internal surface of said groove 32 and the end surfaces of Er cores 3, 4, 5, 6 abut against the bottom of groove 32 of Er back core 31. The other structure is the same as that of prior art shown in FIG. 1 and FIG. 2.

According to this invention, a single Er back core is used, the groove formed at the center thereof results in the ⊐-shaped cross section, the end surfaces of a pair of cores of two Er heads are firmly bridged by said back core, forming a closed magnetic path of the Er magnetic circuit. Thereby, the magnetic efficiency is drastically improved. Moreover, this structure receives little influence from external magnetic fields, distortion of waveform is improved and simultaneously the magnetization phenomenon is also improved. In addition, the Er back core can be mounted with excellent working efficiency just by engaging the end part of the Er cores with the groove, and when they are engaged with each other, the Er cores can be mounted without any fluctuation of dimension into said groove. Thereby, fluctuation of magnetic characteristics can be suppressed as compared with the conventional devices.

What is claimed is:

1. A magnetic head unit comprising:
   a read/write head;
   two erase heads on both sides of said read/write head, each erase head comprising a pair of cores which are separated by a gap on one side which is in contact with a magnetic medium and which have open ends extending beyond said read/write head on the other side from said medium contacting side; and
   a back core having a groove extending along its length in a center part of one side thereof, said groove engaging and bridging the open ends of each of said cores of said two erase heads.

2. A magnetic head according to claim 1, wherein said back core has a rectangular shape and said groove forms a C-shaped cross-section therein.

* * * * *